US011406921B2

(12) United States Patent
Wiseman

(10) Patent No.: US 11,406,921 B2
(45) Date of Patent: *Aug. 9, 2022

(54) GASKET FOR SCREEN FRAME

(71) Applicant: RUFF EQUIPMENT, INC., Magnolia, TX (US)

(72) Inventor: Michael D. Wiseman, Houston, TX (US)

(73) Assignee: Ruff Equipment, Inc., Magnolia, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/060,781

(22) Filed: Oct. 1, 2020

(65) Prior Publication Data
US 2021/0016208 A1 Jan. 21, 2021

Related U.S. Application Data

(63) Continuation of application No. 16/041,352, filed on Jul. 20, 2018, now Pat. No. 10,799,818.

(60) Provisional application No. 62/538,248, filed on Jul. 28, 2017.

(51) Int. Cl.
*B01D 33/03* (2006.01)
*B07B 1/46* (2006.01)

(52) U.S. Cl.
CPC ............ *B01D 33/0376* (2013.01); *B07B 1/46* (2013.01); *B07B 1/469* (2013.01); *B07B 1/4609* (2013.01); *B07B 1/4645* (2013.01); *B07B 1/4663* (2013.01); *B01D 2201/34* (2013.01)

(58) Field of Classification Search
CPC ....... B07B 1/46; B07B 1/4609; B07B 1/4663; B07B 1/469; B07B 1/4645; B01D 33/0376; B01D 2201/34
See application file for complete search history.

(56) References Cited

U.S. PATENT DOCUMENTS

| 6,543,621 B2 | 4/2003 | Baltzer et al. |
| 6,672,460 B2 | 1/2004 | Baltzer et al. |
| 9,149,839 B2 | 10/2015 | Carr et al. |
| 2012/0023829 A1 | 2/2012 | Happel et al. |

*Primary Examiner* — Michael McCullough
*Assistant Examiner* — Kalyanavenkateshware Kumar
(74) *Attorney, Agent, or Firm* — McAfee & Taft

(57) ABSTRACT

A screen assembly for a vibrating shaker is provided. The screen assembly utilizes an elastomeric gasket having a flat profile section and a bulb profile section, wherein said bulb profile section has a hollow interior and is configured so as to form a notched profile section where said bulb profile section connects to said flat profile section.

6 Claims, 7 Drawing Sheets

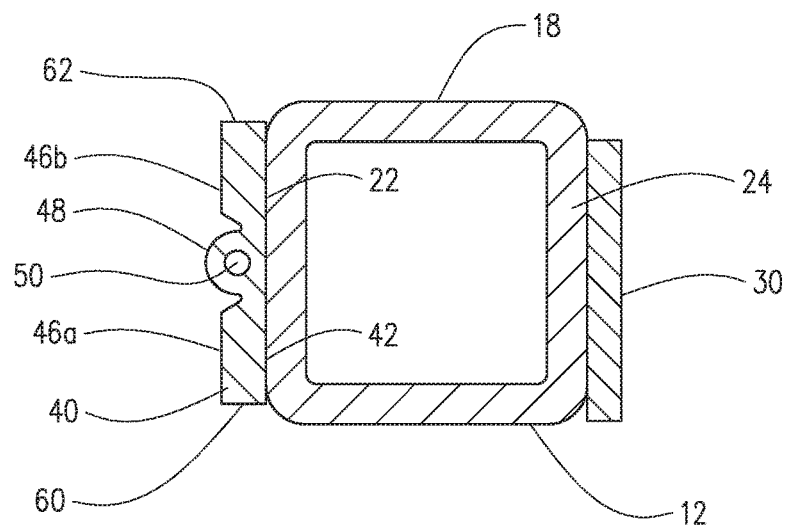
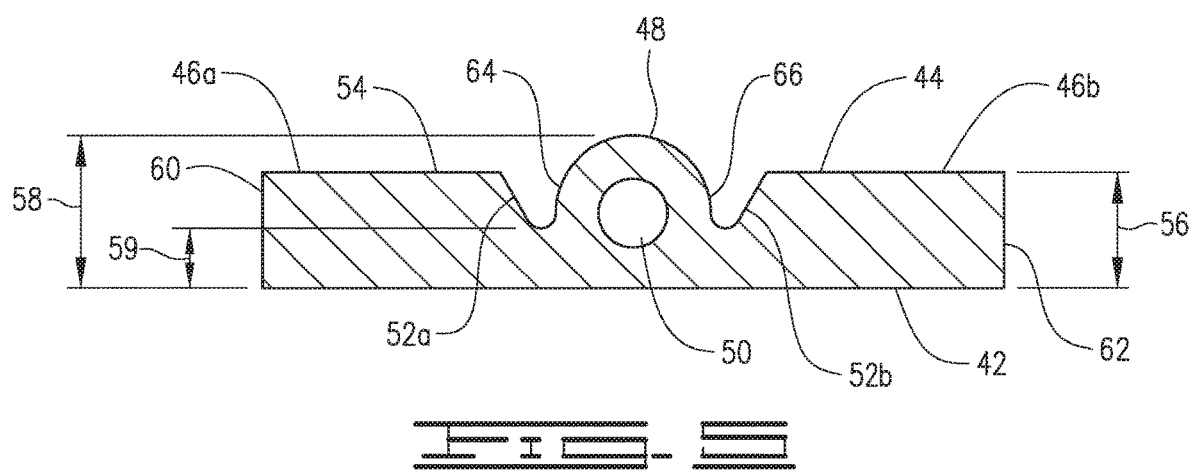

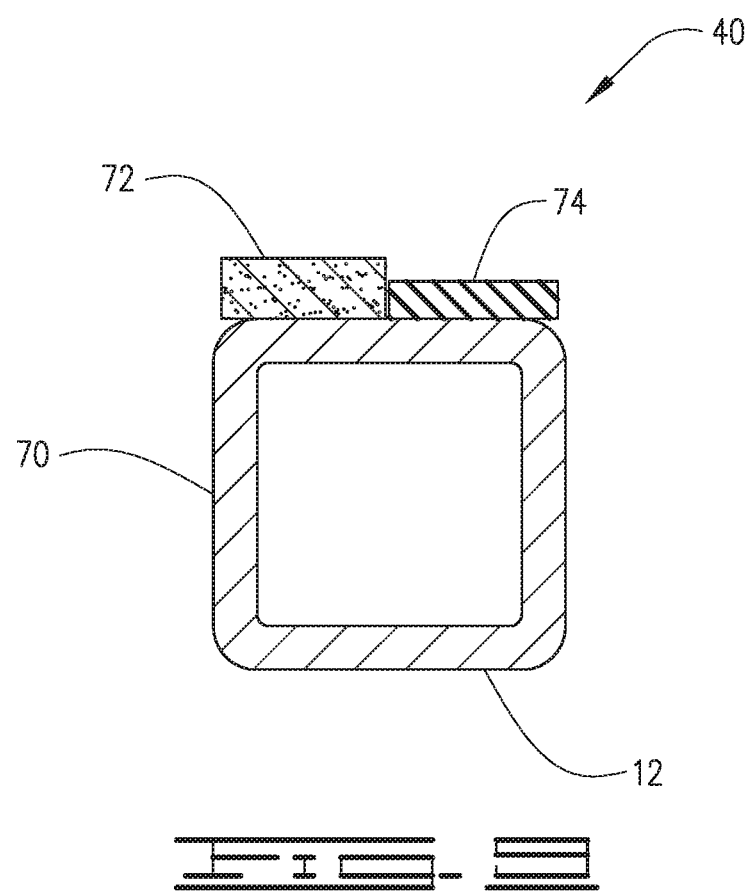

GASKET FOR SCREEN FRAME

CROSS-REFERENCE TO RELATED APPLICATIONS

This application is a continuation of U.S. patent application Ser. No. 16/041,352 filed Jul. 20, 2018 titled "Gasket for Screen Frame", which claims the benefit of U.S. Provisional Application No. 62/538,248 filed Jul. 28, 2017 titled "Gasket for Screen Frame," which are hereby incorporated by reference.

FIELD

The present disclosure relates generally to a vibrating screen assembly used in vibrating screen machines for screening or separating purposes. More specifically, the disclosure relates to gaskets used as a seal between the screen frame and the deck of the vibrating screen machines.

BACKGROUND

Vibrating screen machines (often referred to as shakers) utilize a screen assembly or a plurality of screen assemblies to separate solid material from liquids and fine solid particles. The screen assembly is typically secured in and to the vibrating machinery through use of a frame. In some cases, a single screen assembly will be utilized while in other cases, a plurality of screen assemblies will be aligned adjacent to each other end-to-end. The screen assembly is removably attached to the shaker. A mixture of materials is delivered or fed to the top of the screen assembly. A motor at a high frequency vibrates the screen assembly.

The force of gravity plus the vibration of the screen assembly separates the liquid from particles larger than the pore size, which is made up by the combination of layers. This pore size is called the "cut point." The screen assembly may be inclined when secured in the vibrating shaker so that the solids larger than the cut point will move across the screen where they are gathered and disposed of. The liquid and particles smaller than the cut point pass through the screen assembly and can be collected also.

There are various types of screen assemblies having various frames. In one configuration, a plurality of screen cloth layers is attached to a perforated plate which is, in turn, connected to the frame. The perforated plate has a large number of small openings to minimize the unsupported spans of screen cloth. It is important to achieve good adhesion between the perforated plate and the frame. Thus, the frame must have an adequate planar surface to attach securely to the perforated plate.

In some vibrating shakers, a bed or deck is composed of a plurality of parallel, cushioned rails or gaskets on which the screen assembly or screen assemblies rest. Use of such gaskets, which are adhered to the deck, can be problematic because it can be very time consuming and difficult to change the gaskets when they wear out. Accordingly, such gaskets typically are not changed as often as they should.

In other vibrating shaker designs, the gasket is attached to the screen assembly instead of the bed or deck. In these instances, the gasket is changed whenever the screen is changed since the two represent a single integrated item. In the past, it has been difficult for one gasket to provide both an adequate seal and transmit vibrational energy to the screen assembly. Typically, a design has either not sealed adequately or has acted to dampen the transmitted vibrational energy. In either circumstance, performance of the shaker is hampered.

SUMMARY

In one embodiment there is provided a screen assembly for a vibrating shaker, which comprises a frame, a perforated plate, at least one screen cloth, and an elastomeric gasket. The frame has a top side and an underside. The perforated plate is affixed to the top side of the frame. The screen cloth is affixed to the top side of the frame above the perforated plate. The elastomeric gasket has a flat profile section connected to a compressible section, wherein the flat profile section provides for rigid mount of the frame on the vibrating shaker so as to allow transmission of vibrational energy, and wherein the compressible section is more compressible than the flat profile section so as to provide a fluid tight seal. In some embodiments, the compressible section is comprised of foam rubber. In other embodiments, the compressible section is a bulb profile section.

The bulb profile section has a hollow interior and is configured so as to form a notched profile section where the bulb profile section connects to the flat profile section. In many of these embodiments, the elastomeric gasket has a first surface and a second surface wherein the first surface and second surface oppose each other. The cross-sectional profile is configured such that the first surface is flat and the second surface is configured to provide the flat profile section, the bulb profile section and the notch profile section. The flat profile section has a first height and the bulb section an apex height. Generally, the apex height can be at least 10 percent greater than the first height. The notched profile section has a nadir height. Typically, the nadir height is at least 10 percent less than the first height.

The elastomeric gasket can have a first edge and a second edge, with the first edge opposing the second edge, and with both the first edge and second edge extending from the first surface to the second surface. In one set of embodiments, the bulb profile section is adjacent the first edge, and the flat profile section extends from the notched profile section to the second edge. In another set of embodiments, the flat profile section comprises a first flat profile section and a second flat profile section, and the notched profile section comprising a first notched profile section and a second notched profile section. The first notched profile section is on a first side of the bulb profile section and the second notched profile section is on a second side of the bulb profile section. The first flat profile section extends from the first edge to the first notched profile section, and the second flat profile section extends from the second edge to the second notched profile section.

In many embodiments, the second surface of the elastomeric gasket rests on the vibrating shaker and the first surface of the elastomeric gasket is attached to the underside of the frame.

In many embodiments, the elastomeric gasket is compressible and resilient. The elastomeric gasket can be extruded. Alternatively, the elastomeric gasket can be molded.

BRIEF DESCRIPTION OF THE DRAWINGS

FIG. 4 is a cross-sectional view taken along line 4-4 in FIG. 2.

FIG. 6 is a bottom view of the frame with a perforated plate and sealing gasket in accordance with a second embodiment.

FIG. 9 is a schematic cross-sectional illustration of an alternative embodiment.

DETAILED DESCRIPTION

Figure 1:
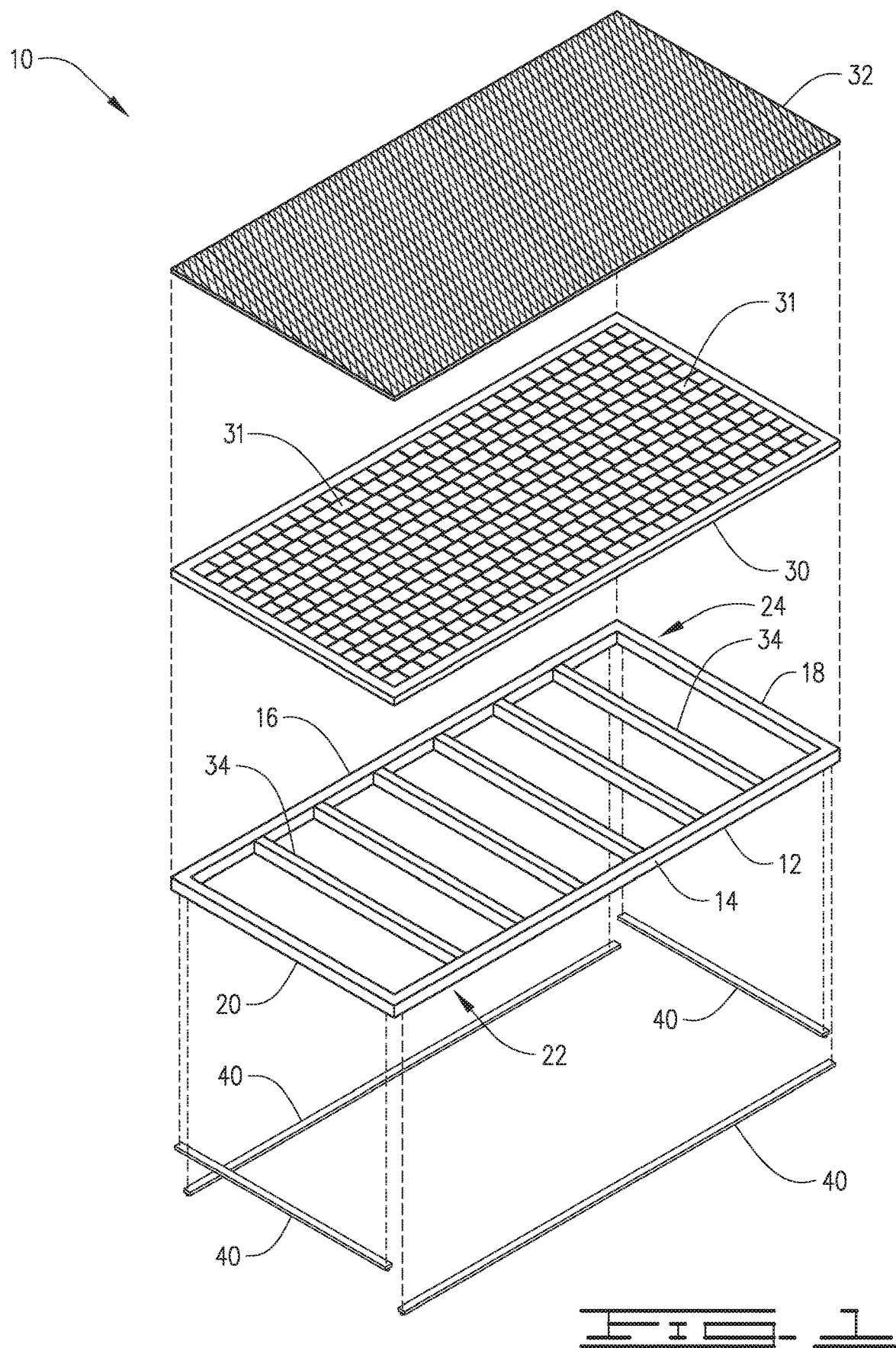
FIG. 1 is an exploded, perspective view of a vibrating assembly in accordance with one embodiment.

In the description that follows, like parts are marked throughout the specification and drawings with the same reference numerals, respectively. The drawings are not necessarily to scale and the proportions of certain parts have been exaggerated to better illustrate details and features of the invention. Where components of relatively well-known designs are employed, their structure and operation will not be described in detail.

Referring to the drawings in detail, FIG. 1 illustrates an exploded, perspective view of one preferred embodiment of a vibrating screen assembly 10 constructed in accordance with the present invention. A frame 12 includes a pair of parallel, opposed sides 14 and 16 and a pair of opposed, parallel ends 18 and 20. Generally, sides (14 and 16) and ends (18 and 20) are composed of steel or aluminum, although it should be understood that other materials, such as composites, might also be used.

Frame 12 includes an underside 22 and an opposed top side 24. Top side 24 of frame 12 has a flat, planar surface. A perforated plate 30 is attached to and secured to the frame 12 in the assembled condition. Perforated plate 30 includes a plurality of openings 31 which are punched or otherwise formed in the plate 30. Perforated plate 30 may include a border area which will align with the planar surfaces of the top side of the frame, providing an area for good adhesion between the frame and the plate.

At least one screen cloth 32 is secured to perforated plate 30. Screen assembly 10 can be made of a single woven wire screen layer or of multiple screen layers.

Frame 12 also includes a plurality of tubular cross supports 34 which extend between the sides 14 and 16. The tubular cross supports may be fabricated from the same or different material as the sides and ends of frame 12.

Figure 2:
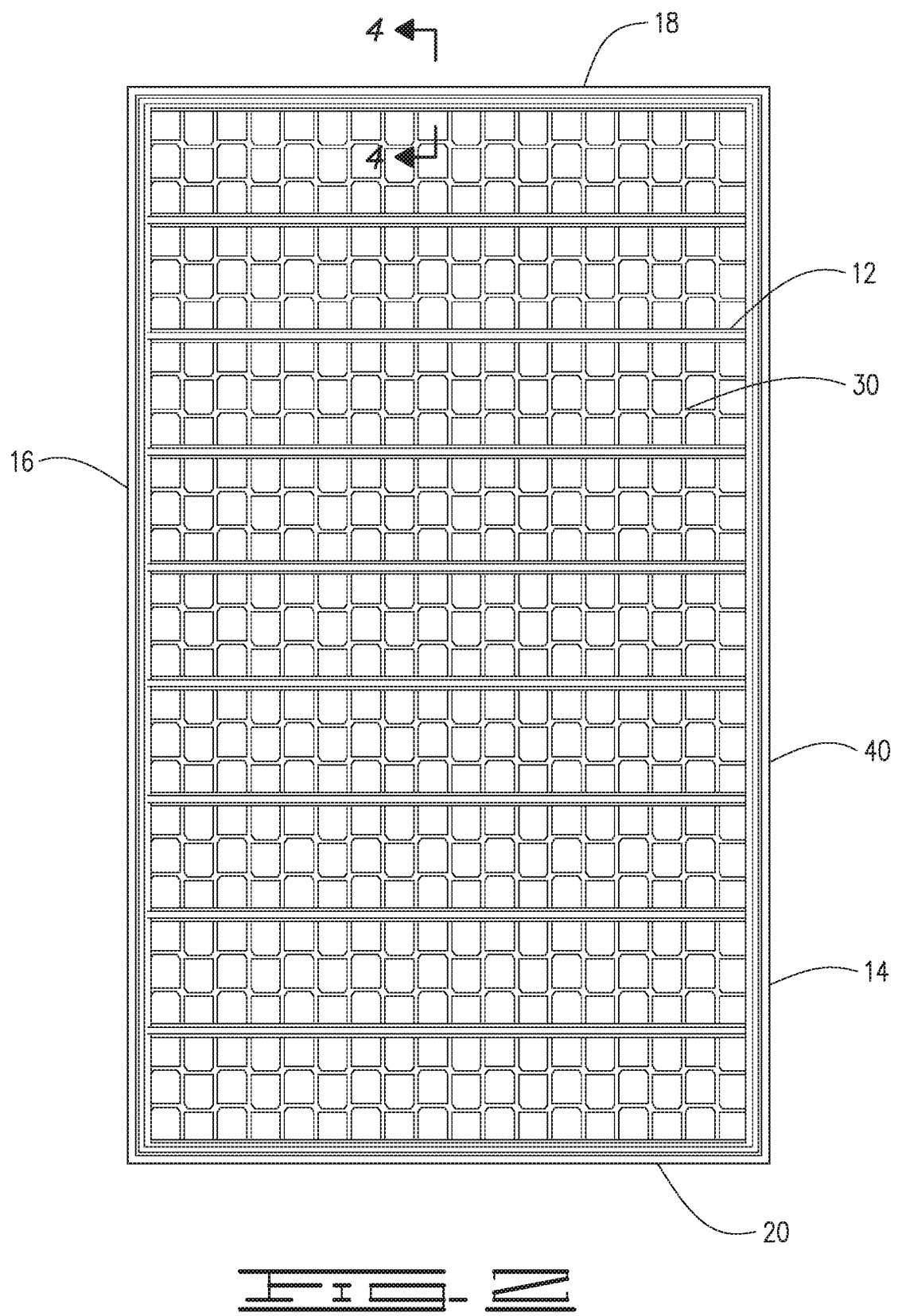
FIG. 2 is a bottom view of the frame with a perforated plate and sealing gasket in accordance with one embodiment.
Figure 3:
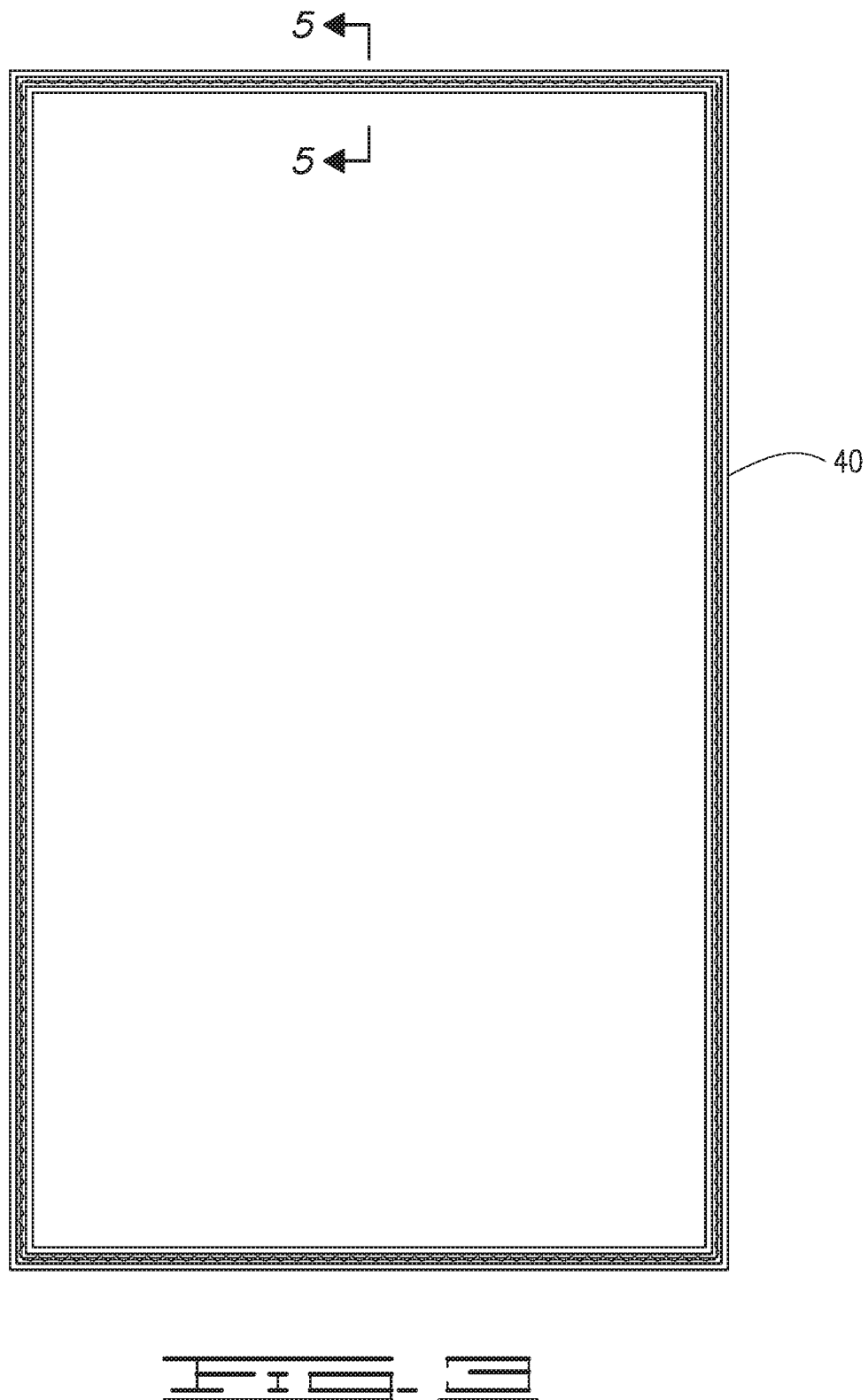
FIG. 3 is a bottom view of a gasket in accordance with the embodiment of FIG. 2.

A gasket 40 is attached to underside 22 of frame 12, as better seen from FIGS. 2, 3 and 4. FIG. 2 illustrates a bottom view of frame 12 with perforated plate 30 and gasket 40 attached. The bottom view of the gasket shown with more detail is illustrated in FIG. 3. FIG. 4 illustrates a cross-sectional view of FIG. 2 along line 4-4. Gasket 40 can be attached to frame 12 by any suitable means such as by directly molding the gasket onto the screen frame or by attaching the gasket by an adhesive, as is known in the art such as for attaching rubber-type compounds to metal or composites. Alternatively, gasket 40 can be attached by fasteners or by other suitable mechanical means, such as insertion of a rail portion of gasket 40 into a slot in frame 12.

Gasket 40 is a sealing gasket and typically is elastomeric. Preferably, gasket 40 is both compressible and resilient. Gasket 40 may be made from any suitable material, for example gasket 40 can be extruded or molded from neoprene, nitrile rubber (Buna N), fluroelastomers (such as sold under the trademark Viton) or other similar materials and then cut into desired lengths, as best seen in FIG. 1. It may be necessary to miter the ends of the gasket 40 to match the frame or alternatively, the ends of the gaskets can be sealed together. Generally, gasket 40 is configured to run around the perimeter of underside 22 of frame 12, as illustrated in FIGS. 2 and 4. As illustrated in FIG. 1, gasket 40 is four pieces or segments installed onto frame 12; however, more typically, the ends of each segment are mitered and joined in a fluid tight seal to one of the other gasket ends (such as by vulcanization) to form one continuous closed gasket prior to installation on frame 12.

Figure 5:
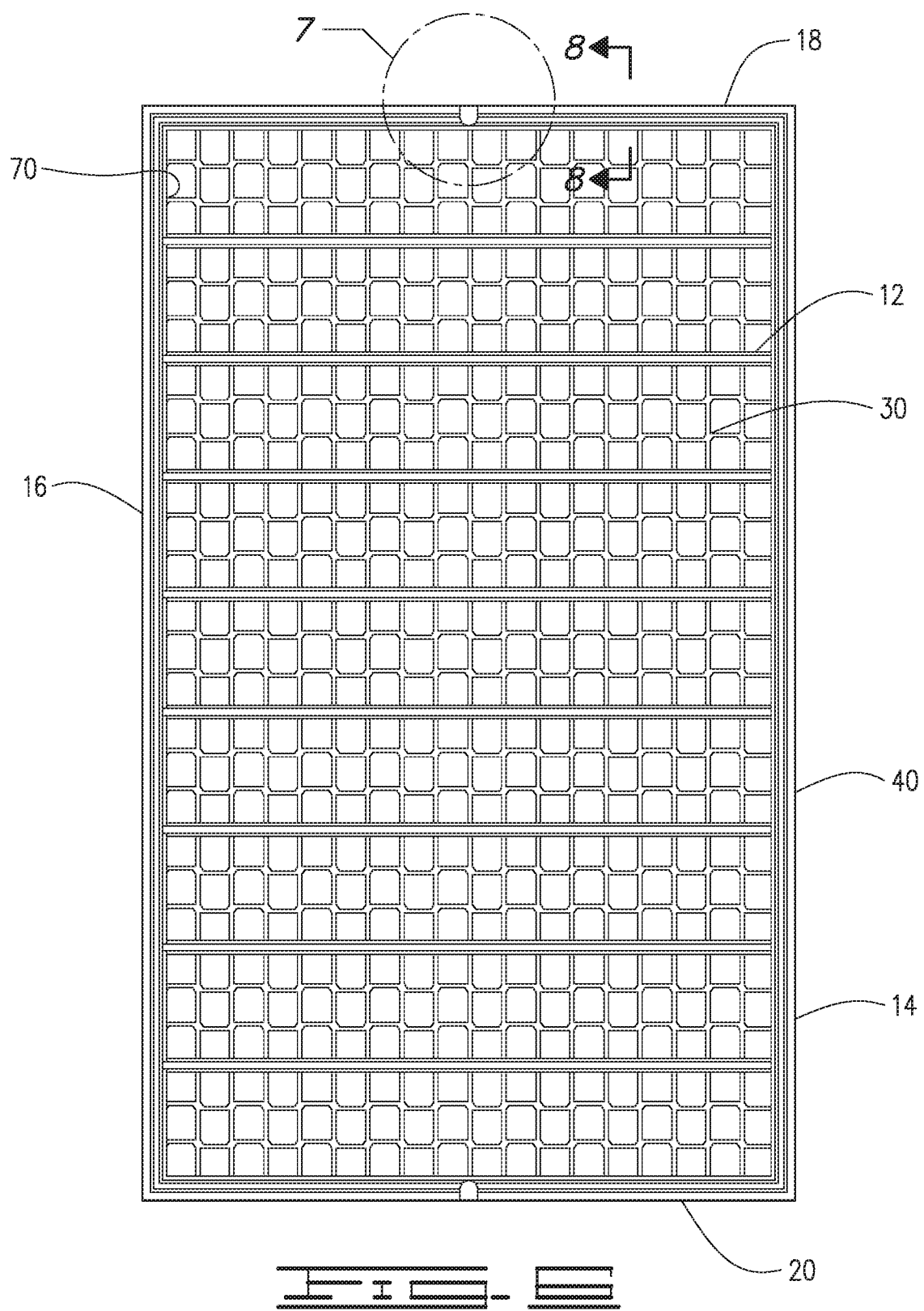
FIG. 5 is an enlarged cross-sectional view of the gasket taken along line 5-5 of FIG. 3.

FIGS. 4 and 5 show the cross-sectional shape of gasket 40 for one embodiment. As shown, gasket 40 has a first or upper surface 42 which is flat and constructed to rest on the underside 22 of frame 12. Underside 22 is typically a flat, planar surface. Generally, upper surface 42 being flat makes it suitable for attachment to frame 12 by adhesive. However, where the attachment is by mechanical means, such as a rail and slot arrangement, upper surface 42 can have another suitable shape.

In the embodiment illustrated in FIGS. 4 and 5, gasket 40 has a second or lower surface 44, which is configured to rest on the bed or rail of a vibrating shaker (not shown) in such a manner as to make a sealing engagement with the bed or rail but not to dampen transmission of vibrational energy, or at least to reduce the dampening effects of the sealing gasket. Accordingly, lower surface 44 has a flat profile section (shown as two flat profile sections 46a and 46b but which could be just one of flat profile sections 46a or 46b) connected to a compressible section, which is illustrated as a bulb profile section 48. Additionally, bulb profile section 48 has a hollow interior 50 and is configured so as to form a notched profile section 52 where bulb profile section 48 connects to the flat profile section 46a and/or 46b. The flat profile section, bulb profile section and notched profile section, all run longitudinally along the length of each segment of gasket 40 such that they run around the perimeter of frame 12 when gasket 40 is installed on frame 12.

Flat profile section 46a and/or 46b has a flat, planar surface 54 such that frame 12 has a rigid mount to allow the transmission of vibrational energy with minimal dampening. Flat profile section 46a and/or 46b also prevents the over compression of bulb profile section 48 of the seal. Typically, the compressible section (for example, bulb profile section 48) is more compressible than flat profile section 46a and/or 46b so that the compressible section provides a fluid tight seal while the flat profile section allows the better transmission of vibrational energy than the compressible section.

Bulb profile section 48 extends outward past surface 54 of flat profile section 46a and/or 46b so that bulb profile section 48 contacts the bed or rail of a vibrational shaker prior to flat profile section 46a and/or 46b contacting the bed or rail. Additionally, bulb profile section 48 has hollow interior 50 such that it can easily compress; thus, the height and hollow interior 50 allow bulb profile section 48 to create a fluid tight seal with the bed or rail of the vibrational shaker. Notched profile section (shown as two notched profile sections 52a and 52b but which could be just one of notched profile section) provides an area for lateral expansion of bulb profile section 48 as it undergoes longitudinal compression when contacting and forming a seal with the bed or rail of a vibrational shaker.

In some embodiments, flat profile section 46a and/or 46b has a first height 56 and bulb profile section 48 has an apex height 58. The apex height is measured from the outermost portion of the bulb. Generally, the apex height can be at least 5 percent, at least 10 percent or at least 20 percent greater than the first height. Generally, the apex height will be no more than 50 percent, no more than 45 percent or no more than 30 percent greater than the first height. In some embodiments, the apex height is from 30 percent to 35 percent greater than the first height. As shown in FIG. 5, the apex height is about 33 percent greater than the first height.

The notched profile section can be round, such as a semicircular shape, or have an angular V-shape. In either configuration, the notched profile section has a nadir height 59, measured from upper surface 42 to notched profile sections innermost point from planar surface 54. Typically, the nadir height is at least 5 percent less, at least 10 percent less or at least 20 percent less than the first height. In some embodiments, the nadir height is no less than 60 percent less, 55 percent less or 50 percent less than the first height. In some embodiments, the nadir height is from 40 percent to 50 percent of the first height, as shown in FIG. 5.

In one embodiment illustrated in FIGS. 4 and 5, the bulb profile section is positioned between two flat profile sections with a notched section on each side. For such embodiments, the two flat profile sections can typically be the same size, and the two-notched sections can typically be the same size. Thus, the bulb profile section will run longitudinally along the center of the gasket. However, it is within the scope of the invention for the bulb profile section to run longitudinally and be closer to or adjacent an edge of the gasket. Also, it is within the scope of the invention for there to be two or more bulb profile sections running longitudinally along the gasket.

For example, in the embodiment illustrated in FIGS. 2, 3, 4 and 5, gasket 40 has a first edge 60 and a second edge 62, with first edge 60 opposing second edge 62, and with both first edge 60 and second edge 62 extending from upper surface 42 to lower surface 44. There are two flat profile sections, a first flat profile section 46a and a second flat profile section 46b. Also, there are two notched profile sections, a first notched profile section 52a and a second notched profile section 52b. First notched profile section 52a is on a first side 64 of bulb profile section 48 and the second notched profile section 52b is on a second side 66 of bulb profile section 48. First flat profile section 46a extends from first edge 60 to first notched profile section 52a, and second flat profile section 46b extends from second edge 62 to second notched profile section 52b. Further, as illustrated, first and second flat profile sections 46a and 46b have equal widths, and first and second notched profile sections 52a and 52b have equal widths.

Figure 7:
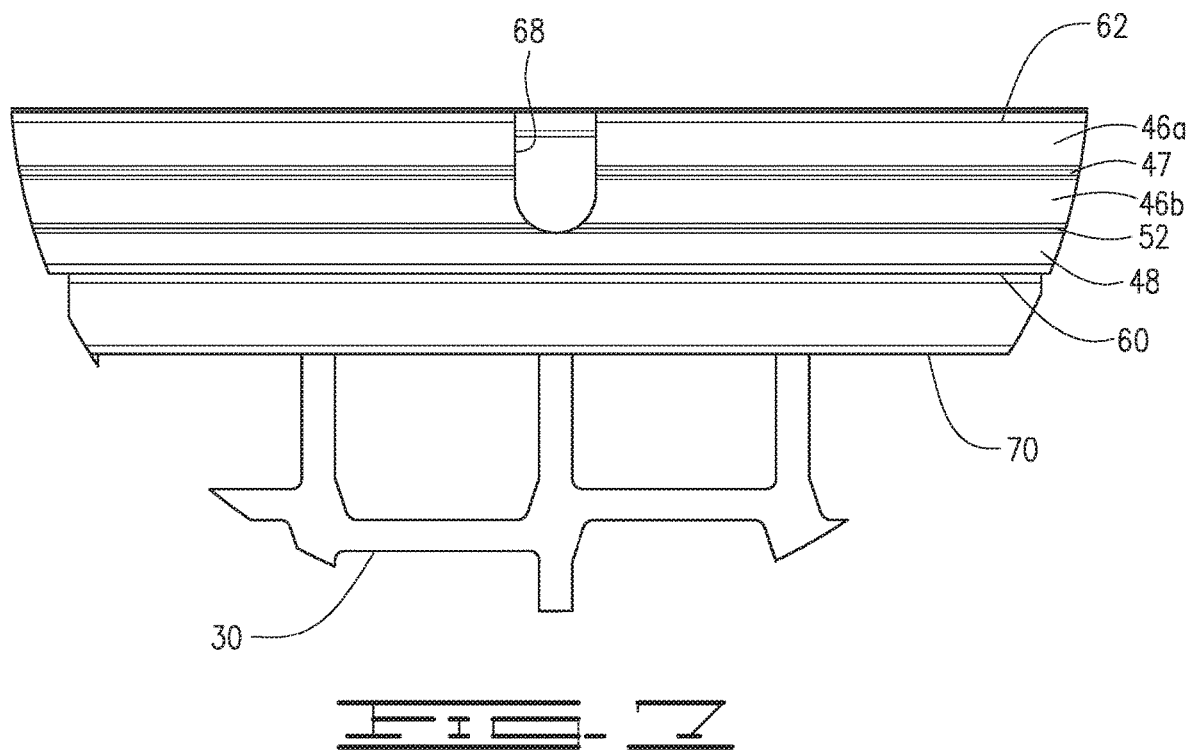
FIG. 7 is an explosive view of area 7 from FIG. 6.
Figure 8:
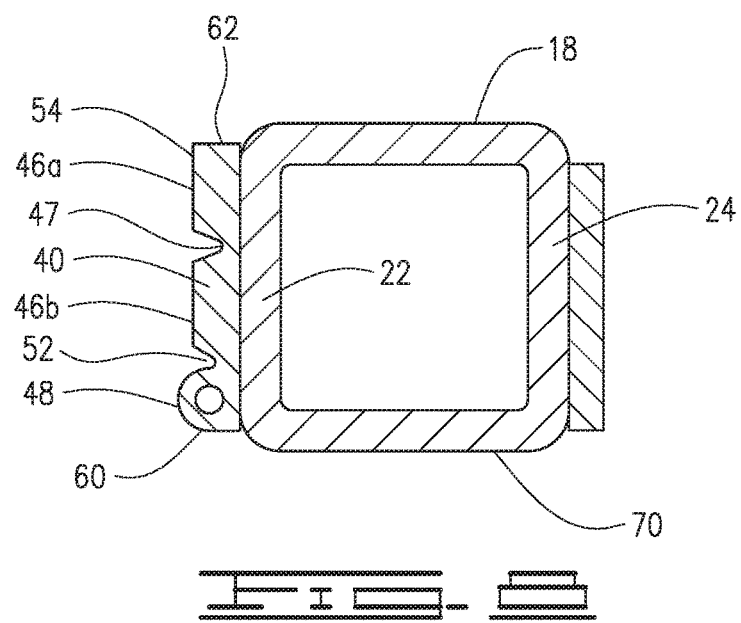
FIG. 8 is a cross-sectional view taken along line 8-8 in FIG. 6.

In another embodiment illustrated in FIGS. 6, 7 and 8, the bulb profile section 48 is located at an inner edge 70 of the border of frame 12, which is made of sides 14 and 16 and ends 18 and 20. For example, in some vibratory shakers, a notch or hole 68 is needed to allow for a deck pin (a retaining pin). In such embodiments, having the bulb profile section intersecting with the notch would prevent a liquid tight seal from being obtained at notch 68. However, the rigid mounting provided by the flat profile surface is not adversely affected by notch 68. Accordingly, bulb profile section 48 is positioned so as to run longitudinally adjacent first edge 60 of gasket 40, which is aligned with inner edge 70 and can be adjacent inner edge 70. Flat profile section extends from notched profile section 52 to second edge 62, which typically is adjacent to an outer edge of frame 12. As illustrated in FIGS. 7 and 8, flat profile section comprises a first flat profile section 46a and a second flat profile section 46b with a notch profile section 47 joining the two flat profile sections 46a and 46b. Alternatively, flat profile section can be a single flat profile section extending from notched profile section 52 to second edge 62 without any notch in the single flat profile section. Thus, it is within the scope of the invention for the flat profile section of the embodiments to be one continuous profile section or divide into two, three or more flat profile sections separated by notched profile sections.

The width of the gasket 40 (from first edge 60 to second edge 62) can have a total flat profile section width sufficient to provide a rigid mount to allow the transmission of vibrational energy. Additionally, the total width of bulb profile section 48, include the notched profile section 52, can be sufficient to make a liquid tight seal between frame 12 and the vibrational shaker. Generally, the width of the flat profile section can be from about 50% to about 90% of the total width of gasket 40, and more typically, the width of the flat profile section can be from 60% to 85% or from 65% to 80% of the total width of gasket 40. Generally, the total width of bulb profile section 48 (including notched profile section 52) can be from about 10% to about 50% of the total width of gasket 40, and more typically from 15% to 40% or from 20% to 35% of the total width of gasket 40. Notched profile section 52 can generally be up to 70% of the width of the bulb profile section 48, but more typically, can be up to about 50% of the width of the bulb profile section 48. Generally, if used, notch profile section 52 can be at least about 10%, or at least about 20%, or at least 25% of the width of bulb profile section 48.

In the alternative embodiment illustrated in FIG. 9, gasket 40 comprises a foam rubber segment 72, which replaces the bulb profile section, in many embodiments both the bulb section and notched segment adjacent the bulb section are replaced with foam rubber segment 72. In this embodiment, there is a flat profile segment 74 which is adjacent to and can be attached to or integral with foam rubber segment 72. Typically, foam rubber segment 72 will be adjacent inner edge 70 but can be centered between two flat profile segments, or flat profile segment 74 can be adjacent inner edge 70 and foam rubber segment 72 can be between flat profile segment 74 and the outer edge of frame 12.

When foam rubber segment 72 is used, its height can be at least 5 percent, at least 10 percent or at least 20 percent greater than the first height of flat profile segment 74. Generally, the height will be no more than 100 percent, no more than 50 percent or no more than 30 percent greater than the first height. In some embodiments, the height is from 30 percent to 35 percent greater than the first height.

Generally, the width of flat profile segment 74 can be from about 50% to about 90% of the total width of gasket 40, and more typically, the width of flat profile segment 74 can be from 60% to 85% or from 65% to 80% of the total width of gasket 40. Generally, the total width of foam rubber segment 72 (including a notched profile section, if any) can be from about 10% to about 50% of the total width of gasket 40, and more typically from 15% to 40% or from 20% to 35% of the total width of gasket 40.

Foam rubber segment 72 can be made from any suitable foam rubber-type compound, such as foam neoprene, foam nitrile rubber, foam fluroelastomers or other materials.

Although the invention has been described with reference to a specific embodiment, the foregoing description is not intended to be construed in a limiting sense. Various modifications as well as alternative applications will be suggested to persons skilled in the art by the foregoing specification and illustrations. It is therefore contemplated that the appended claims will cover any such modifications, applications or embodiments as followed in the true scope of this invention.

What is claimed is:

1. A screen assembly for a vibrating shaker, which comprises:
    a frame having a top side and an underside;
    a perforated plate affixed to said top side of said frame;
    at least one screen cloth affixed to said top side of said frame above said perforated plate; and
    an elastomeric gasket having a first surface and a second surface and a cross-sectional profile, wherein said cross-sectional profile is configured such that said first surface is opposed to said second surface, said first surface is flat and said second surface is configured to have a flat profile section connected to a compressible section, wherein said first surface is attached to the frame, and the second surface is configured to rest on the vibrating shaker such that the flat profile section rests on the vibrating shaker so as to provide for rigid mount of the frame on the vibrating shaker and so as to allow transmission of vibrational energy, and wherein the compressible section rests on the vibrating shaker and is more compressible than the flat profile section so as to provide a fluid tight seal when compressed in contact with the vibrating shaker, and
    wherein the compressible section is a bulb profile section, wherein said bulb profile section has a hollow interior and is configured so as to form a notched profile section where said bulb profile section connects to said flat profile section.

2. The screen assembly of claim 1, wherein the said notched profile section provides an area for lateral expansion of the bulb profile section as the bulb profile section undergoes longitudinal compression when contacting and forming the fluid tight seal with the vibrational shaker.

3. The screen assembly according to claim 2, wherein said flat profile section has a first height and said bulb section an apex height which is at least 10 percent greater than said first height.

4. The screen assembly according to claim 3, wherein said elastomeric gasket is compressible and resilient.

5. The screen assembly according to claim 4, wherein said elastomeric gasket is extruded.

6. The screen assembly according to claim 4, wherein said elastomeric gasket is molded.

* * * * *